(12) United States Patent
Hanson et al.

(10) Patent No.: US 9,692,897 B2
(45) Date of Patent: Jun. 27, 2017

(54) ROUTING CALLS TO PREFERRED AGENTS

(71) Applicant: BANK OF AMERICA CORPORATION, Charlotte, NC (US)

(72) Inventors: Carrie Anne Hanson, Charlotte, NC (US); Alicia C. Jones-McFadden, Fort Mill, SC (US); Craig Sobol, Waxhaw, NC (US); Brent Alan Shelkey, Huntersville, NC (US); Kimberly Ya-chin Chang, Houston, TX (US); Sarah Beth Gottfried, Westlake, OH (US); Wang Liang, Pasadena, CA (US); Neha Rani Rathi, Reston, VA (US); Anthony Scott Wong, Union, KY (US)

(73) Assignee: Bank of America Corporation, Charlotte, NC (US)

( * ) Notice: Subject to any disclaimer, the term of this patent is extended or adjusted under 35 U.S.C. 154(b) by 136 days.

(21) Appl. No.: 14/530,350

(22) Filed: Oct. 31, 2014

(65) Prior Publication Data
US 2016/0127555 A1    May 5, 2016

(51) Int. Cl.
| | | |
|---|---|---|
| *H04M 3/523* | (2006.01) | |
| *H04M 3/54* | (2006.01) | |
| *H04N 7/14* | (2006.01) | |

(52) U.S. Cl.
CPC ........ *H04M 3/5232* (2013.01); *H04M 3/5238* (2013.01); *H04M 3/54* (2013.01); *H04M 2201/50* (2013.01); *H04M 2203/408* (2013.01); *H04M 2203/6009* (2013.01); *H04M 2203/6045* (2013.01); *H04N 7/147* (2013.01)

(58) Field of Classification Search
CPC .................................. H04W 4/00; H04M 3/42
USPC .................................................. 455/415, 417
See application file for complete search history.

(56) References Cited

U.S. PATENT DOCUMENTS

| | | | |
|---|---|---|---|
| 6,553,113 | B1 | 4/2003 | Dhir et al. |
| 6,792,102 | B2 | 9/2004 | Shires |
| 7,242,760 | B2 | 7/2007 | Shires |
| 7,353,016 | B2 | 4/2008 | Roundtree et al. |
| 7,676,221 | B2 | 3/2010 | Roundtree et al. |
| 8,270,582 | B1 | 9/2012 | Kirchhoff et al. |
| 8,306,202 | B2 | 11/2012 | Citron et al. |

(Continued)

*Primary Examiner* — Muthuswamy Manoharan
(74) *Attorney, Agent, or Firm* — Michael A. Springs; Moore & Van Allen PLLC; Patrick B. Horne

(57) ABSTRACT

Embodiments are directed to routing customer calls to preferred agents. Embodiments receive a call from a customer using a user device; determine an identity of the customer; retrieve information associated with the matching entry; based at least in part on the retrieved information, select one or more agents; and route the call to one of the selected agents. Some embodiments determine a telephone number from which the call was received; comparing the telephone number with a plurality of entries in a customer information database; and determining that the telephone number matches an entry in the database. Other embodiments receive a communication from the user device indicating that the customer has placed the call; determine that the customer is currently authenticated through an online banking session or a mobile application on the user device; and receive a communication from the user device indicating the customer's identity.

18 Claims, 6 Drawing Sheets

(56) References Cited

U.S. PATENT DOCUMENTS

| | | | |
|---|---|---|---|
| 8,462,934 B1 | 6/2013 | Cordell et al. | |
| 8,503,646 B1 | 8/2013 | Kirchhoff et al. | |
| 8,666,378 B2* | 3/2014 | Spence | H04M 3/51 455/415 |
| 8,731,180 B2 | 5/2014 | Benefield et al. | |
| 2003/0165223 A1* | 9/2003 | Timmins | G06Q 10/02 379/207.02 |
| 2006/0062376 A1* | 3/2006 | Pickford | H04M 3/5183 379/265.12 |
| 2007/0269038 A1 | 11/2007 | Gonen et al. | |
| 2009/0261157 A1 | 10/2009 | Kumar et al. | |
| 2012/0130763 A1 | 5/2012 | Katz | |
| 2013/0173687 A1* | 7/2013 | Tuchman | G06Q 30/0601 709/202 |
| 2014/0133646 A1 | 5/2014 | Ma et al. | |
| 2014/0146959 A1 | 5/2014 | Spence et al. | |

\* cited by examiner

ROUTING CALLS TO PREFERRED AGENTS

BACKGROUND

In some circumstances, a customer may desire to speak with or ask a question of a representative of a financial institution. Currently, the customer must go to a banking facility, speak with the representative over the phone, or chat with the representative via text based communications. All of these methods have limitations including inconvenience and lack of ability to select representatives for interaction.

BRIEF SUMMARY

Embodiments of the invention are directed to systems, methods and computer program products for routing customer calls to preferred agents. The apparatus includes a memory; a processor; and a computing module stored in the memory, executable by the processor, and to cause the processor to receive a call from a customer using a user device; determine an identity of the customer; retrieve information associated with the matching entry; based at least in part on the retrieved information, select one or more agents; and route the call to one of the selected agents.

In some embodiments, determining the identity of the customer comprises determining a telephone number from which the call was received; comparing the telephone number with a plurality of entries in a customer information database; and determining that the telephone number matches an entry in the database.

In some embodiments, determining the identity of the customer comprises receiving a communication from the user device indicating that the customer has placed the call. In some such embodiments, determining the identity of the customer further comprises determining that the customer is currently authenticated through an online banking session or a mobile application on the user device. In some of these embodiments, the computing module further causes the processor to receive a communication from the user device indicating the customer's identity.

In some embodiments, the computing module further causes the processor to retrieve information indicating one or more of the customer's preferred agents; and wherein selecting the agent is based on the one or more preferred agents.

In some embodiments, the computing module further causes the processor to determine a wait time for each of the selected one or more agents; initiate communication of the wait times to the customer; receive input from the customer indicating which of the one or more agents to route the call; and wherein routing the call to one of the selected agents comprises routing the call to the agent indicated by the customer.

In some embodiments, the computing module further causes the processor to determine a wait time for each of the selected one or more agents; determine a wait time for a next available non-selected agent; initiate communication of the wait times for the selected agents and the next available non-selected agent to the customer; receive input from the customer indicating which of the one or more agents or next available agent to route the call; and wherein routing the call to one of the selected agents comprises routing the call to the agent indicated by the customer.

In some embodiments, the computing module further causes the processor to determine a purpose of the call; and wherein the routing is based at least in part on the determined purpose for the call. In some such embodiments, the computing module further causes the processor to determine the purpose of the call by requesting and receiving customer input indicating the purpose of the call. In other such embodiments, the computing module further causes the processor to receive customer input indicating the customer would like to conduct a video call; and in response, forward the call to a video desktop computer, thereby resulting in the call becoming the video call. In some of these embodiments, the computing module further causes the processor to receive customer input indicating the customer would like to conduct a mobile call; and in response, forward the video call to a mobile phone, thereby resulting in the video call becoming the mobile call.

According to embodiments of the invention, a method includes receiving a call from a customer using a user device; determining an identity of the customer; retrieving information associated with the matching entry; based at least in part on the retrieved information, selecting one or more agents; and routing the call to one of the selected agents.

In some such embodiments, determining the identity of the customer comprises determining a telephone number from which the call was received; comparing the telephone number with a plurality of entries in a customer information database; and determining that the telephone number matches an entry in the database.

In some embodiments, determining the identity of the customer comprises receiving a communication from the user device indicating that the customer has placed the call. In some such embodiments, determining the identity of the customer further comprises determining that the customer is currently authenticated through an online banking session or a mobile application on the user device. In some of these embodiments, the method also includes receiving a communication from the user device indicating the customer's identity.

In some embodiments, the method includes retrieving information indicating one or more of the customer's preferred agents; and wherein selecting the agent is based on the one or more preferred agents.

In some embodiments, the method includes determining a wait time for each of the selected one or more agents; initiating communication of the wait times to the customer; receiving input from the customer indicating which of the one or more agents to route the call; and wherein routing the call to one of the selected agents comprises routing the call to the agent indicated by the customer.

According to embodiments of the invention, a computer program product includes a non-transitory computer-readable medium comprising a set of codes for causing a computer to receive a call from a customer using a user device; determine an identity of the customer; retrieve information associated with the matching entry; based at least in part on the retrieved information, select one or more agents; and route the call to one of the selected agents.

BRIEF DESCRIPTION OF THE DRAWINGS

Figure 1:
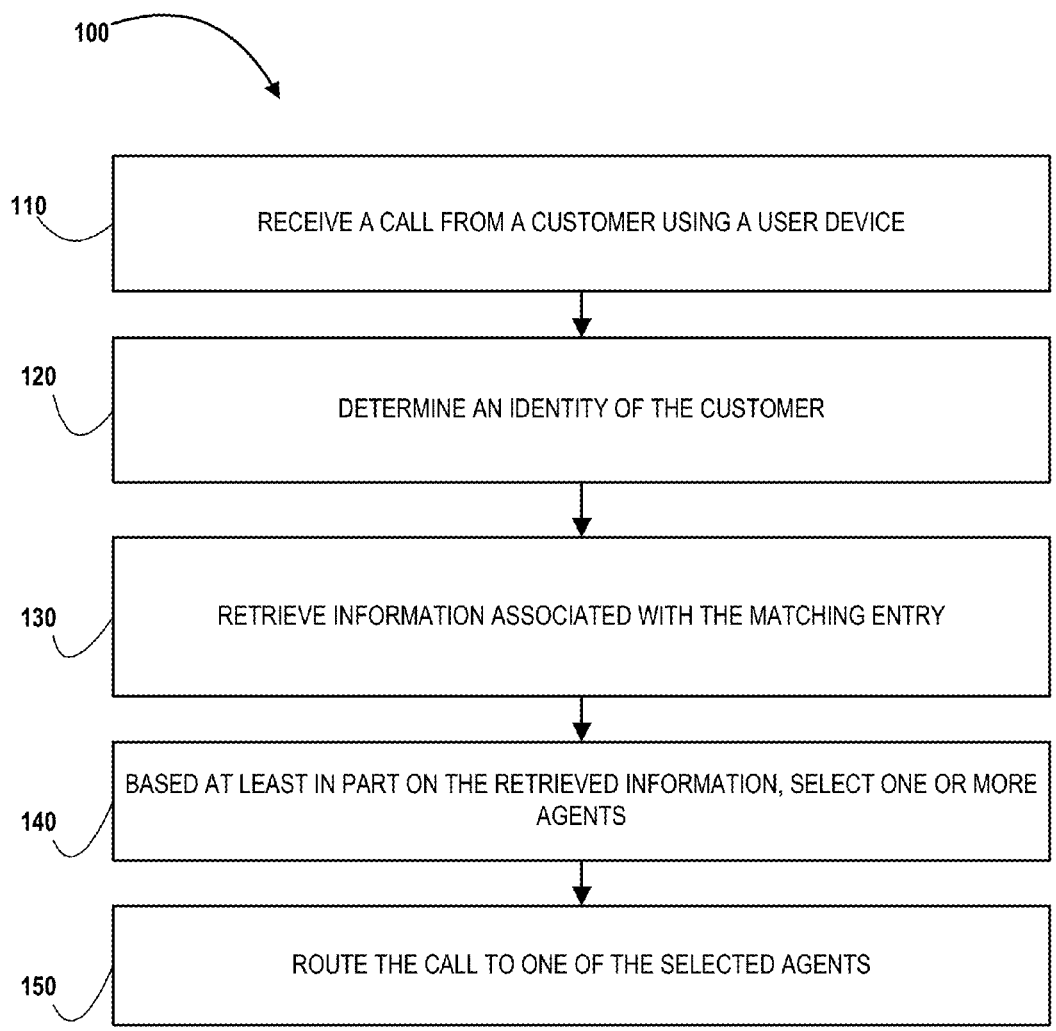
Figure 2:
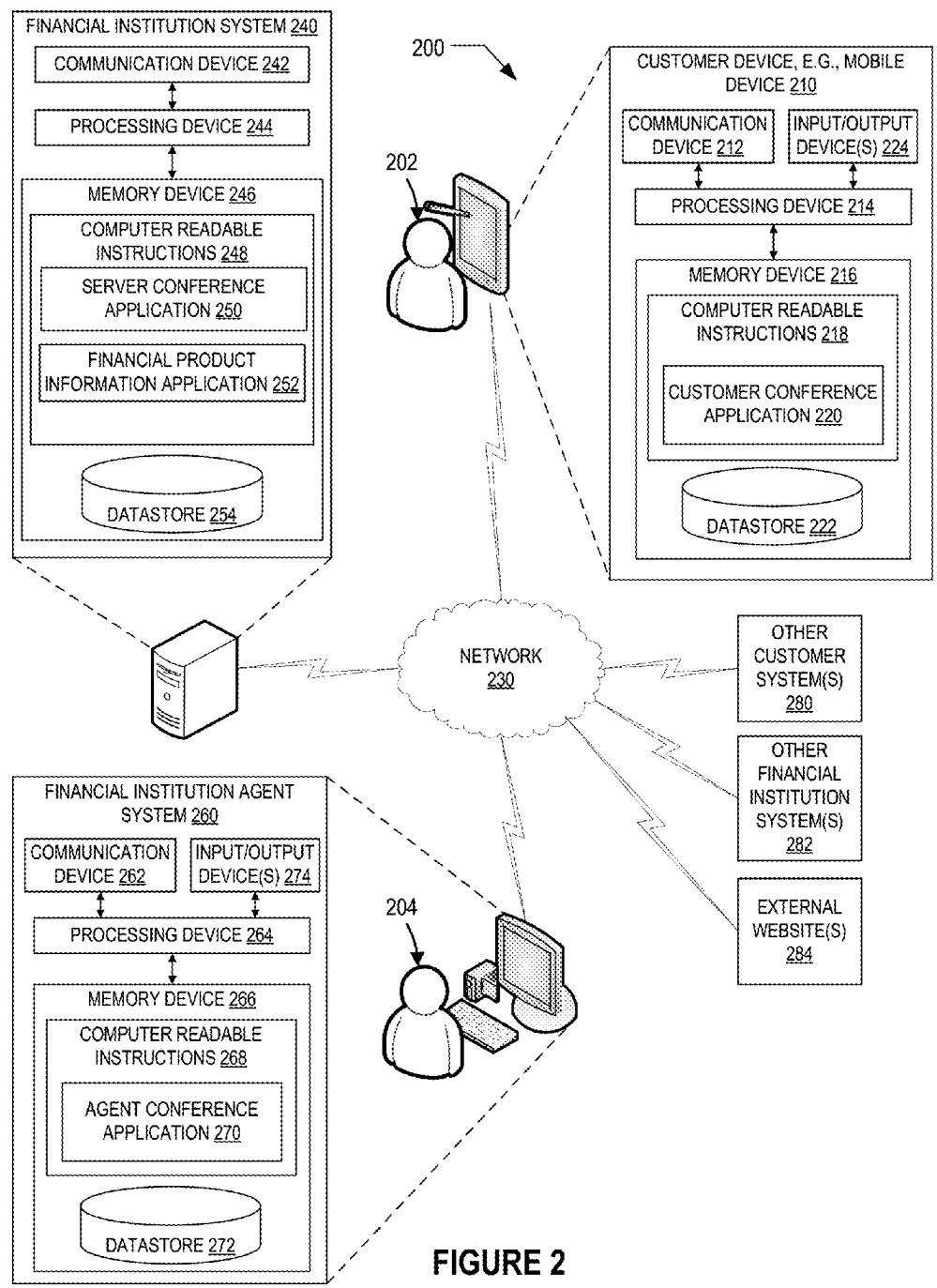
Figure 3:
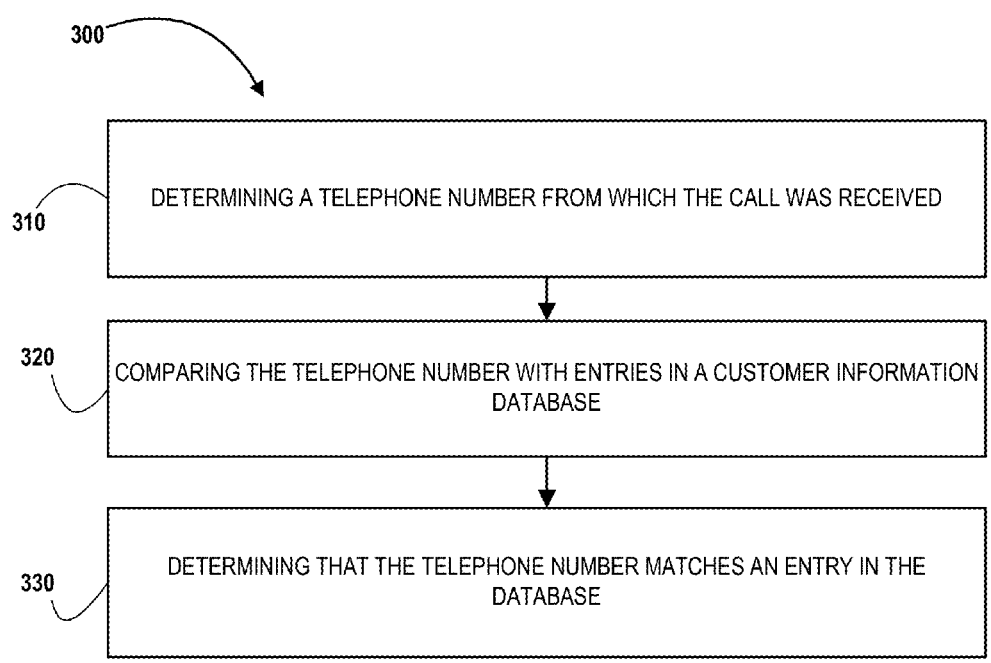
Figure 4:
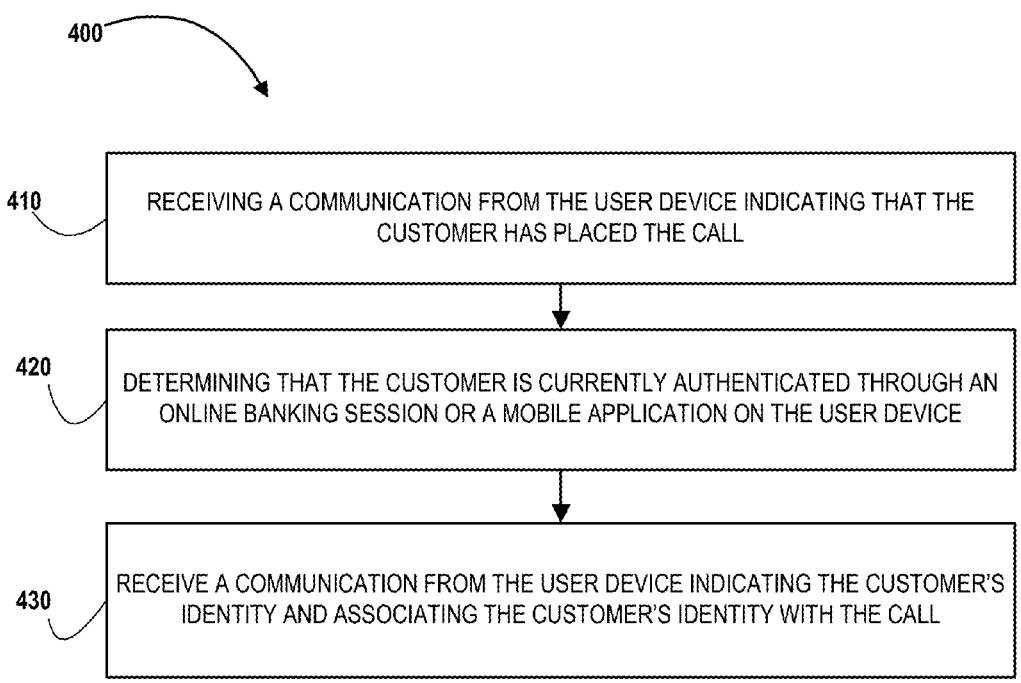
Figure 5:
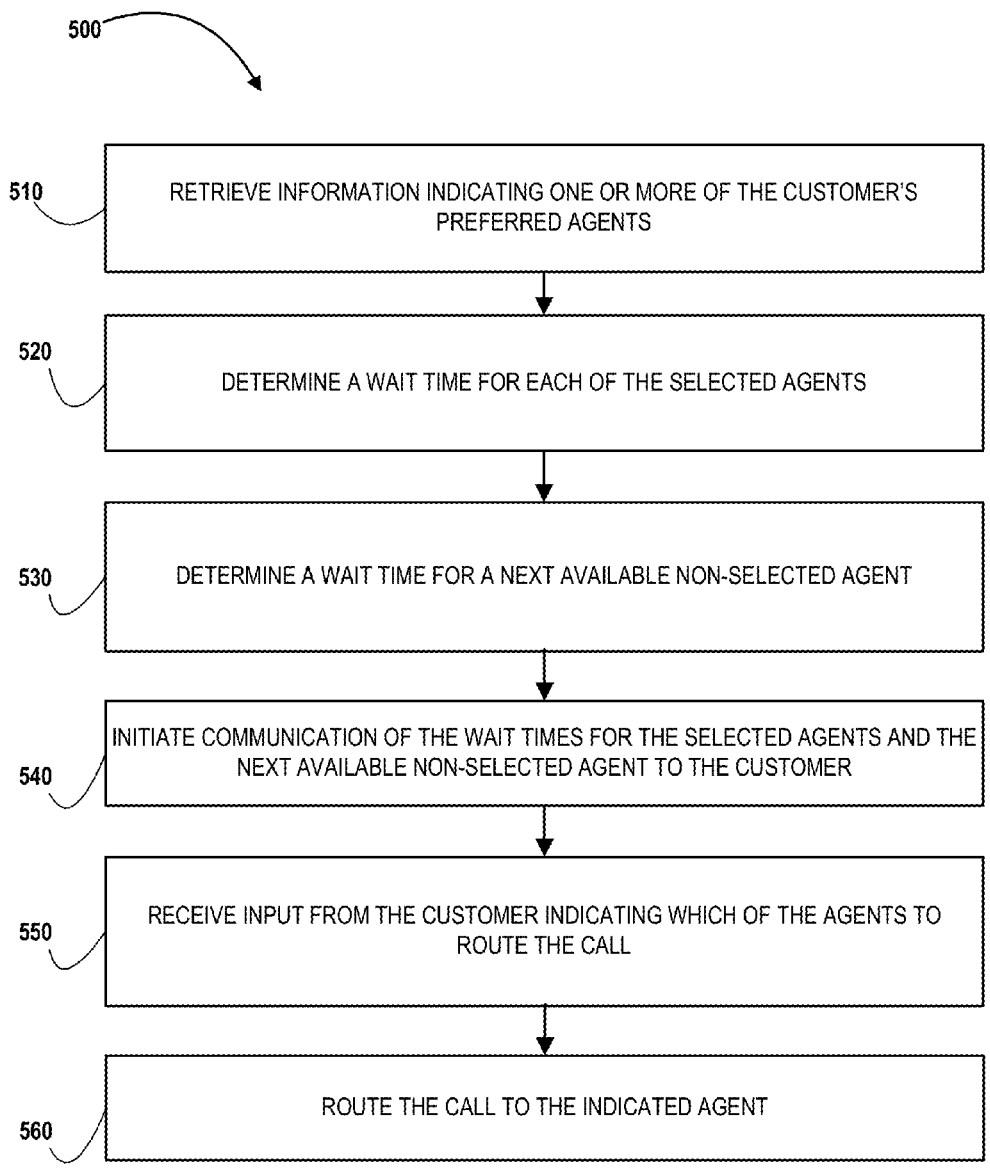
Figure 6:
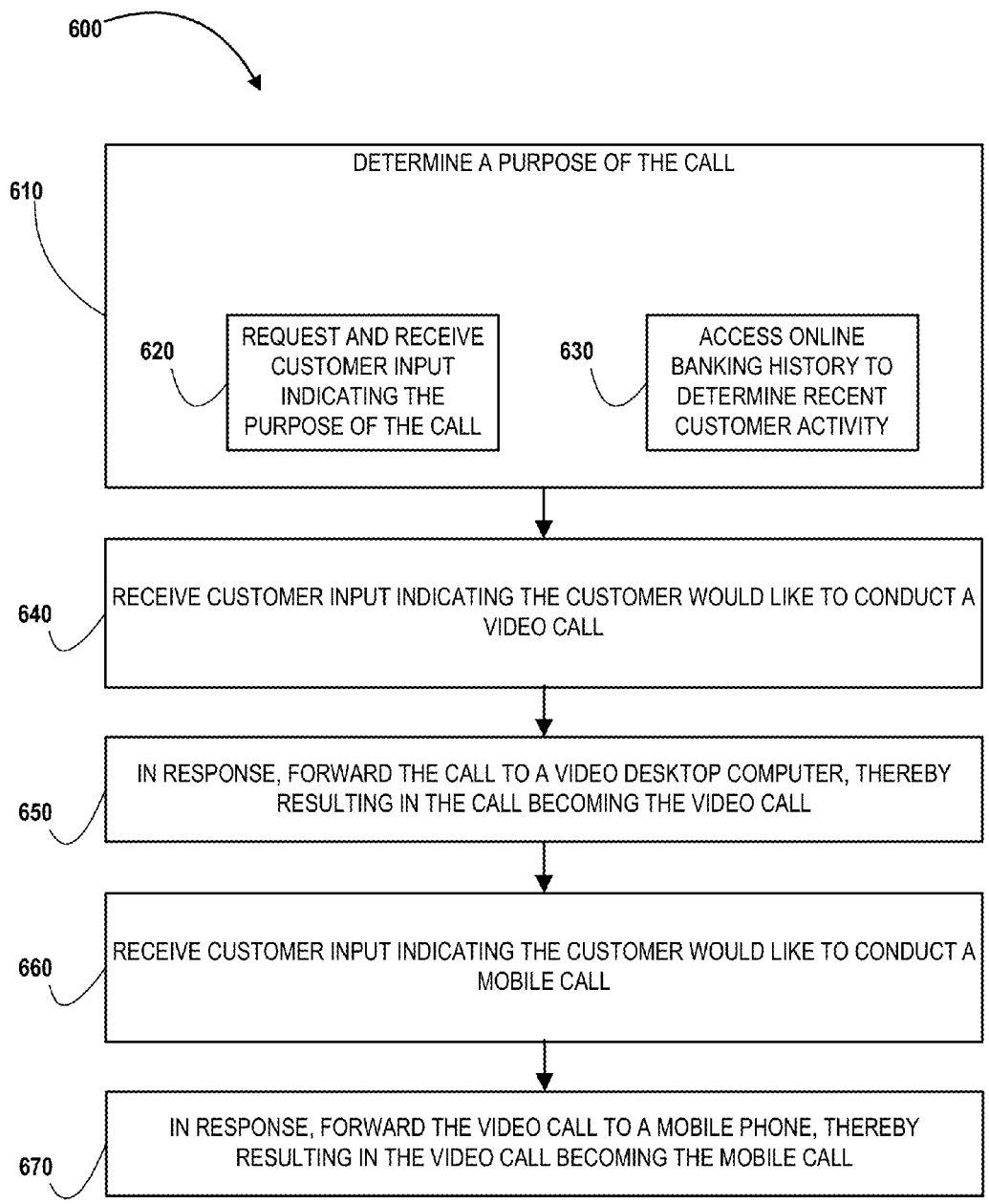

Having thus described embodiments of the invention in general terms, reference will now be made to the accompanying drawings, where:

FIG. 1 is a high level flowchart illustrating a general process flow for routing customer calls to preferred agents, in accordance with embodiments of the invention;

FIG. 2 is block diagram of an environment wherein embodiments of the invention operate, in accordance with embodiments of the invention;

FIG. 3 is a flowchart illustrating a general process flow for determining customer identity based on telephone number, in accordance with embodiments of the invention;

FIG. 4 is a flowchart illustrating a general process flow for determining customer identity based on communication from the customer's device in accordance with embodiments of the invention;

FIG. 5 is a flowchart illustrating a process flow for routing a call to a preferred agent, in accordance with embodiments of the invention; and FIG. 6 is a flowchart illustrating a process flow for including some optional features for routing calls to preferred agents in accordance with embodiments of the invention.

DETAILED DESCRIPTION OF EMBODIMENTS OF THE INVENTION

Embodiments of the invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments are directed to routing customer calls to preferred agents. A financial institution system may recognize the customer (e.g., through the phone number making the call or through current authentication of the customer), access the customer's preferences, such as a list of preferred agents, and routes the call to the preferred agent(s).

For example, the financial institution system may receive a call from a customer using a user device and determines an identity of the customer. The system then retrieves information associated with the matching entry, and, based at least in part on the retrieved information, selects one or more agents. The customer may be given an opportunity to choose one from a group of agents selected by the system, and once the final selection has been made, the system routes the call to one of the selected agents. Some embodiments of the system determine a telephone number from which the call was received and compare the telephone number with a plurality of entries in a customer information database to determine that the telephone number matches an entry in the database, thereby identifying the calling customer. Other embodiments of the system receive a communication from the user device indicating that the customer has placed the call. The communication may be initiated by a mobile application running on the user device that either (i) facilitates the call itself (such as over the Internet) or (ii) recognizes that a cellular call has been made and communicates the identity of the customer (and/or the user device) and associates the customer/user device with the call.

In various cases, a menu on the user device provides the customer with an indication of the wait time for speaking to a preferred agent and/or the wait time for speaking to a next available agent (that may or may not be a preferred agent). The system may then receive customer input regarding whether the customer desires to wait until a preferred agent becomes available or, on the other hand, that the customer desires to speak to the next available agent.

Routing of the call may further be based on the topic associated with the call, which may be input by the customer and/or may be discerned by reviewing the customer's recent online banking activity. Further, routing of the call may be modified as requested by the customer. For example, in some cases, the customer may be conducting a call on a cellular phone and request forwarding of the call to a desktop computer (or vice versa) when the customer leaves or arrives at their home or office.

As such, embodiments of the present invention improve the ability of an entity such as a financial institution, to route calls to appropriate associates/agents of the entity. The system accesses customer preference information and/or other data such as social media and/or customer network data in real-time to determine which of a pool of agents/associates should be presented to the customer for selection for a call. In some cases, the customer has provided preferences for which agent to speak with and in other instances various pieces of disparate data may be analyzed to calculate the most likely preferred agent/associate with whom the customer should speak. The real-time information used to calculate the preference is based not only on customer and/or associate/agent input, but also based on dynamic contextual information that changes when the customer and/or an associate/agent takes actions within online banking, mobile banking, financial institution systems and/or the like. The aggregation of information/data from multiple disparate sources in order to generate and present the customer with selections for routing the call requires complex interconnectivity among all the systems involved and near real-time data communication and processing. Thus, the system of the present invention provides significant improvements over traditional call routing methods because it actively and dynamically updates the customer's information, agents/associates information and may access current information regarding the customer/agent/associate or others' activities. The present invention reduces the amount of time it takes for a customer to the most likely preferred agent and provides the customer and/or agent an opportunity to manage the call by selecting another preferred agent during a current call and forwarding the current call to the newly selected agent.

Referring now to FIG. 1, a flowchart illustrates a method 100 for routing customer calls to preferred agents. The first step is to receive a call from a customer using a user device, as represented by Block 110. The call may be placed over traditional cellular networks or may be facilitated using the Internet, such as through a mobile application on the customer's user device. The mobile application may be a financial institution mobile application.

The next step, as represented by Block 120, is to determine an identity of the customer. The identity of the customer may be determined in a variety of ways as discussed further below. For example, the identity of the customer may be determined by recognizing the telephone number from which the call has been received and performing a look up of the number to determine the identity associated with the number. In other embodiments, the mobile application of the user device may communicate information to the financial institution server indicating the identity of the customer making the call. This may be in conjunction with a traditional cellular call made by the user using the user device or may be in conjunction with an application such as the financial institution mobile application facilitating the telephone call over the Internet.

The next step, represented by Block 130, is to retrieve information associated with the matching entry. Once the identity of the caller is determined, the receiving entity may look up the identity of the customer and determine whether there is any information regarding the customer's preferences, such as preferences regarding agents. In other cases, the customer may have previously spoken to one or more agents regarding the same, similar and/or different issues and may have expressed a preference to speak again with or not to speak again with one or more of the agents with which the customer has previously spoken. Other information may be taken into consideration as well. For example, the customer may have personal information such as address, affinities or the like that can be used to match the customer with one or more potential agents.

The next step, as represented by Block 140, is to select, based on the retrieved information, one or more agents. The agent may be selected based on whether the customer has previously spoken with a specific agent, whether the customer has provided specific feedback regarding a specific agent, what the customer's general preferences include (such as preferring to speak to someone located nearby geographically or otherwise), what problem the customer is seeking help with and/or the like. In some cases, more than one agent is selected and the system requests the customer choose which of the selected agents the customer would like to speak with. Once the final selection has been made, the next step, as represented by Block 150, is to route the call to one of the selected agents.

Referring now to FIG. 2, a block diagram illustrates an environment 200 wherein a customer 202 participates in a conference with a financial institution agent 204 using a customer device 210 and a financial institution agent system 260, respectively. The environment also may include a financial institution system 240, other customer systems 280, other financial institution systems 282 and/or external websites 284. The systems and devices communicate with one another over a network 230 and perform one or more of the various steps and/or methods according to embodiments of the invention discussed herein.

A customer device 210 may be configured for use by a customer or other user, for example, to access one or more other financial institution applications such as the customer conference application 220. The customer device 210 may be or include a computer system, server, multiple computer system, multiple servers, or some other computing device configured for use by a user, such as a desktop, laptop, tablet, or a mobile communications device, such as a smartphone. The mobile device 210 has a communication device 212 communicatively coupled with a processing device 214, which is also communicatively coupled with a memory device 216 and one or more input and/or output devices 224, for example, an image capture device such as camera and/or a microphone. The processing device 214 is configured to control the communication device 212 such that the customer device 210 communicates across the network 230 with one or more other systems, for example, the financial institution agent system 260. The processing device 214 is also configured to access the memory device 216 in order to read the computer readable instructions 218, which in some embodiments include a customer conference application 220. The memory device 216 also may have a datastore 222 or database for storing pieces of data for access by the processing device 214.

The financial institution agent system 260 may be a workstation used by a representative to communicate with customers using the conference application. In some embodiments, the financial institution agent system 260 may communicate with one or more of the other systems or devices and may perform one or more steps and/or one or more methods as described herein. In some embodiments, the financial institution agent system 260 includes a communication device 262 communicatively coupled with a processing device 264, which is also communicatively coupled with a memory device 266 one or more input and/or output devices 224, for example, an image capture device such as camera and/or a microphone. The processing device 264 controls the communication device 262 such that the financial institution agent system 260 communicates across the network 230 with one or more other systems or devices. The processing device 264 is also configured to access the memory device 266 in order to read the computer readable instructions 268, which in some embodiments include an agent conference application 270 having instructions for communicating with the customer conference application 220 running on the customer device 210 and/or the server conference application 250 running on the financial institution system 240. In some embodiments, the financial institution agent system 260 includes one or more datastores 272 for storing and providing one or more pieces of data used by the agent during conferences with customers.

A financial institution system 240 is a computer system, server, multiple computer systems and/or servers or the like. The financial institution system 240, in the embodiments shown has a communication device 242 communicably coupled with a processing device 244, which is also communicably coupled with a memory device 246. The processing device 244 is configured to control the communication device 242 such that the financial institution system 240 communicates across the network 230 with one or more other systems. The processing device 244 is also configured to access the memory device 246 in order to read the computer readable instructions 248, which in some embodiments includes a server conference application 250. The memory device 246 also has a datastore 254 or database for storing pieces of data for access by the processing device 244. In some embodiments, the agent conference application interacts with the server conference application to access information, document or other data for use during a conference call. In some embodiments, a financial product information application 252 retrieves information regarding financial products being discussed during a call between a customer and an agent and provides the information to the customer and/or the agent during the call and/or after the call has ended.

The applications 220, 250 and 270 are for instructing the processing devices 214, 244 and 264 to perform various steps of the methods discussed herein, and/or other steps and/or similar steps. In various embodiments, one or more of the applications 220, 250 and 270 are included in the computer readable instructions stored in a memory device of one or more systems other than the systems 240 and 260 or device 210. For example, in some embodiments, the application 220 is stored and configured for being accessed by a processing device of one or more other customer systems 280 connected with an agent through network 230. In various embodiments, the applications 220, 250 and 270 stored and executed by different systems/devices are different. In some embodiments, the applications 220, 250 and 270 stored and executed by different systems may be similar and may be configured to communicate with one another, and in some embodiments, the applications 220, 250 and 270 may be considered to be working together as a singular application despite being stored and executed on different systems. In some embodiments, the applications 220, 250 and 270 stored and executed by the customer device and/or an application stored and executed on one of the other systems is a stand-alone application 220 and does not necessarily communicate or rely on any other applications for data, processing or otherwise, except for providing a connection with an agent through the application 270.

In various embodiments, one of the systems discussed above, such as the financial institution system 240, is more than one system and the various components of the system are not collocated, and in various embodiments, there are multiple components performing the functions indicated herein as a single device. For example, in one embodiment, multiple processing devices perform the functions of the processing device 244 of the financial institution system 240 described herein. In various embodiments, the financial institution system 240 includes one or more of the financial institution agent system 260, the other financial institution systems 282, and/or any other system or component used in conjunction with or to perform any of the method steps discussed herein.

In various embodiments, the financial institution system 240, the customer device 210, the financial institution agent system 260 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 100, the other methods discussed below, or other methods, processes or steps discussed herein or not discussed herein.

According to embodiments of the invention, an interactive conference system, which may include one or more of the financial institution system 240, the customer device 210 and/or the financial institution agent system 260, may provide an interactive conference between an agent of the financial institution and a user or customer. When "system" is used in general, that is, without referring to a specific system, it should be understood that one or more of the systems and device discussed with reference to FIG. 2 may be performing the method step or function being discussed. The system may provide the user an opportunity to connect with a preferred agent.

Referring now to FIG. 3, a flowchart illustrates a method 300 for determining customer identity based on telephone number according to embodiments of the invention. The first step, represented by Block 310, is determining a telephone number from which the call was received. The next step, as represented by Block 320, is comparing the telephone number with entries in a customer information database. Block 330 is determining that the telephone number matches an entry in the database.

Referring now to FIG. 4, a flowchart illustrates a method 400 for determining customer identity based on communication from the customer's device according to embodiments of the invention. The first step, as represented by Block 410, is receiving a communication from a user device indicating that the customer has placed a call. This communication may be initiated by the user device when the user device recognizes that the user device has dialed a number associated with a financial institution. In some cases, the communication may be initiated when the user device is running a mobile application that facilitates the call, such as a mobile banking application that facilitates a video call using the user device. In such an instance, the user device may communicate information regarding the identity of the customer and/or the user device in conjunction with facilitating the call.

The next step, represented by Block 420, is to determine that the customer is currently authenticated through an online banking session or a mobile application on the user device. The next step, as represented by Block 430, is receiving a communication from the user device indicating the customer's identity and associating the customer's identity with the call.

The determination of step 420 may be performed in order to validate the identity of the user as a customer of the financial institution. For example, if the user makes a cellular call to the financial institution, the mobile application of the user's device may communication information indicating the user's identity and/or the user device identity only if the user has recently authenticated using the mobile application (or in some cases using an online banking session). In other embodiments, the mobile application may initiate identity information and may require the user to authenticate to the mobile application (or online banking session) before communicating the identity information. In some cases, no identity information is communicated to the financial institution system other than the telephone number (or in some cases a mobile application and/or user device ID) that may be used to determine the source of the call (and in some cases thereby, the identity of the customer/user device).

Referring now to FIG. 5, a flowchart illustrates a method 500 for routing a call to a preferred agent according to embodiments of the invention. The first step, as represented by Block 510, is retrieving information indicating one or more of the customer's preferred agents. This information may be explicit information indicating one or more of the financial institution's agents are preferred to the customer. In other cases, the information may indicate a preference for one or more traits of an agent, such as their level of experience or area of expertise. In other cases, the information may indirectly indicate preferred agents based on the customer's personal information and/or based on a set of rules configured to analyze the customer's information and determine a best match out of the pool of available agents.

The next step, represented by Block 520, is to determine a wait time for each of the selected agents. The next step, as represented by Block 530, is to determine a wait time for a next available non-selected agent. The non-selected agents may simply be the agents in the pool of agents that have not been identified as preferred agents for the customer (that is, they are not specifically called out in the customer's preferences, their characteristics/traits do not match the customer's preferences and/or they have not be identified as matching agents based on the system's set of rules).

The next step, as represented by Block 540, is to initiate communication of the wait times for the selected agents and the next available non-selected agent to the customer so that the customer may choose from among the presented agents. The next step, as represented by Block 550, is to receive input from the customer indicating to which of the agents to route the call. The next step, represented by Block 560, is to route the call to the indicated agent.

Referring to FIG. 6, a flowchart illustrates a method 600 including some optional features for routing calls to preferred agents. The first step, Block 610, is to determine a purpose of the call, which may include requesting and receiving customer input indicating the purpose of the call, as represented by Block 620 or may include accessing online banking history to determine recent customer activity, as represented by Block 630.

The next optional step, as represented by Block 640 is to receive customer input indicating the customer would like to conduct a video call. In response, the next step is forwarding the call to a video desktop computer, thereby resulting in the call becoming the video call, as represented by Block 650. The next steps as receiving customer input indicating the customer would like to conduct a mobile call in Block 660 and in response, forwarding the video call to a mobile phone, thereby resulting in the video call becoming the mobile call, as represented by Block 670.

In various embodiments, the system is an intelligent system that learns from its interactions with customers. For example, the system may determine whether a customer interaction with a specific agent has been a positive or negative interaction and may update the customer's preferences based thereon. For example, the system may directly ask the customer to rate the interaction or may discern a rating from criteria such as analysis of the language, tone, inflexion, or other characteristics of the audio associated with the call. In this way, the system may facilitate future calls with agents with whom the customer enjoyed a positive interaction and discourage or eliminate altogether the possibility that a customer will again conduct a call with an agent with whom the customer had a negative interaction.

In various embodiments, a call may be forwarded to a favorite advisor of the customer's family, social network or other network. In this regard, even if the customer has not set up preferences for agents, the system may place a call with a preferred agent of a close network connection of the customer. For example, if the customer has not set up agent preferences, but the customer's spouse has indicated a preference for a particular agent, then the system may forward the call to the spouse's preferred agent.

In various embodiments, information may be aggregated from any or all potential mediums or sources to determine to which agent to forward a call. For example, in some embodiments, the system pulls information from the customer's social media interactions to determine a potential purpose of a call and/or to determine the agent with whom the customer is most likely to prefer. This preference determination may be performed based on similarities between the customer and the agent determined from social media data and/or other publicly available data.

In various embodiments, the system may, instead of placing a customer on hold waiting for a preferred agent, provide the customer an opportunity to request a call back from the preferred advisor. For example, if the preferred advisor is expected to be available in thirty (30) minutes, the system may present the customer with the option to select a different, currently available advisor or receive a call back from the preferred advisor in thirty (30) minutes.

In various embodiments, a non-preferred advisor may identify a preferred advisor and transfer a call to the identified preferred advisor. For example, if the non-preferred advisor recognizes that an interaction with a customer is not an ideal fit (e.g., the non-preferred advisor has different expertise or the customer has expressed an interest to speak with someone different), then the non-preferred advisor may access the customer's preferred advisor list and forward a call to a preferred advisor. In another scenario, the non-preferred advisor may request that the system identify a preferred advisor for the customer based on various information available to the system such as the customer's transaction history, the purpose of the call, and/or other data such as social media and/or network data.

The user device may be a desktop computer, a laptop computer, a tablet, a mobile device, or another type of computing device. For example, the user device may be a gaming system, a kiosk at a merchant or a public locale, or a rental device. In an exemplary embodiment, the user device is a computing device such as a tablet that allows the user to conduct a video conference, e.g., the user device includes a video camera, a microphone, speakers, and a display screen. In an embodiment, the user device is the previously discussed customer device.

As used herein, a user may be a customer of the financial institution but is not required to be. For example, the user may be an existing customer of the financial institution, meaning that the user has had at least one account with the financial institution either currently or previously active. The user may also be a new customer or a prospective customer of the financial institution. For example, the user may be an individual searching for competitive mortgage rates and discussing mortgage applications with multiple financial institutions. The user may not have a current or previous relationship with the financial institution but is considering developing one and would like to ask questions of a representative regarding the possibility of becoming a customer.

The system may establish an operative connection between the user device and a system associated with the agent of the financial institution. The system associated with the agent is to be broadly construed as being a set of hardware and software that provides the representative access to the conference. The system may include at least a portion of the financial institution system, e.g., the server and databases associated with the financial institution. For example, the system associated with the agent may provide access to a user's financial transaction history for a plurality of accounts. In some embodiments, the user first provides an access code or authentication code allowing the user and the agent to access portions of the user's data on the financial institution server. The system associated with the agent may also include the specific hardware and software that allows the agent to participate in the conference. This hardware and software may include the video camera, speaker, microphone, headset, display, and/or operating system for connecting with a variety of user computing devices.

In an embodiment, the agent is an employee of the financial institution. The agent may be a general customer service representative or a specialized representative. In an embodiment, the user is able to select the agent that the user would like to work with in the conference. In another embodiment, the agent is a contractor that works with the financial institution to provide customer service. For example, the contractor may provide specialized customer service in an area that financial institution employees do not specialize.

For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a debit account, a credit account, a non-monetary user profile that includes only personal information associated with the user, or the like. The account is associated with and/or maintained by the entity. In other embodiments, an entity may not be a financial institution.

The operative connection established between the user device and the system associated with the representative of the financial institution facilitates a conference between the user and the agent. In an exemplary embodiment, the conference is a video conference between the user and the agent. The conference allows interaction between the user and the agent. In some embodiments, the conference is a teleconference based on a phone system as well as an interactive display screen. In a still further embodiment, the conference is an interactive screen and text-based communication. For example, the user may be in a public locale and not desire audible communication with the agent. Instead, the user may communicate with the agent via text, such as by typing comments on a keyboard, while still have access to the interactive display screen.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for routing customer calls to preferred agents, the apparatus comprising:
    a memory;
    a processor; and
    a computing module stored in the memory, executable by the processor, and to cause the processor to:
        receive a telephone call from a customer using a user device;
        determine an identity of the customer;
        retrieve information associated with a matching entry;
        based at least in part on the retrieved information, select one or more agents;
        determine a purpose of the telephone call, the determining comprising:
            accessing an online banking history corresponding to the customer,
            determining recent customer financial activity based on the accessed online banking history, and
            determining the purpose of the telephone call based on the recent customer financial activity;
        route the telephone call to one of the selected agents based at least in part on the determined purpose for the telephone call;
        receive customer input indicating the customer would like to conduct a video call;
        in response to receiving the customer input, forward the telephone call to a video desktop computer, thereby resulting in the telephone call becoming the video call;
        determine an interaction rating associated with the video call based at least in part on analysis of audio characteristics associated with the video call, wherein the audio characteristics comprise language, tone, and inflection associated with a call; and
        based on determining the interaction rating, update a list of one or more preferred agents associated with the customer.

2. The apparatus of claim 1, wherein determining the identity of the customer comprises:
    determining a telephone number from which the telephone call was received;
    comparing the telephone number with a plurality of entries in a customer information database; and
    determining that the telephone number matches an entry in the database.

3. The apparatus of claim 1, wherein determining the identity of the customer comprises:
    receiving a communication from the user device indicating that the customer has placed the telephone call.

4. The apparatus of claim 3, wherein determining the identity of the customer further comprises:
    determining that the customer is currently authenticated through an online banking session or a mobile application on the user device.

5. The apparatus of claim 4, wherein the computing module further causes the processor to:
    receive a communication from the user device indicating the customer's identity.

6. The apparatus of claim 1, wherein the computing module further causes the processor to:
    retrieve information indicating the one or more preferred agents associated with the customer; and
    wherein selecting an agent is based on the one or more preferred agents.

7. The apparatus of claim 1, wherein the computing module further causes the processor to:
    determine a wait time for each of the selected one or more agents;
    initiate communication of the wait times to the customer;
    receive input from the customer indicating which of the one or more agents to route the telephone call; and
    wherein routing the telephone call to one of the selected agents comprises routing the telephone call to the agent indicated by the customer.

8. The apparatus of claim 1, wherein the computing module further causes the processor to:
    determine a wait time for each of the selected one or more agents;
    determine a wait time for a next available non-selected agent;
    initiate communication of wait times for the selected agents and the next available non-selected agent to the customer;
    receive input from the customer indicating which of the one or more agents or next available agent to route the telephone call; and
    wherein routing the telephone call to one of the selected agents comprises routing the telephone call to the agent indicated by the customer.

9. The apparatus of claim 1, wherein the computing module further causes the processor to:
    determine the purpose of the telephone call at least in part by requesting and receiving customer input indicating the purpose of the telephone call.

10. The apparatus of claim 1, wherein the computing module further causes the processor to:
    receive customer input indicating the customer would like to conduct a mobile call; and
    in response, forward the video call to a mobile phone, thereby resulting in the video call becoming the mobile call.

11. A method for routing customer calls to preferred agents, the method comprising:
    receiving a telephone call from a customer using a user device;
    determining an identity of the customer;
    retrieving information associated with a matching entry;
    based at least in part on the retrieved information, selecting one or more agents;
    determine a purpose of the telephone call, the determining comprising:
        accessing an online banking history corresponding to the customer,
        determining recent customer financial activity based on the accessed online banking history, and
        determining the purpose of the telephone call based on the recent customer financial activity;
    receiving customer input indicating the customer would like to conduct a video call;

routing the telephone call to one of the selected agents based at least in part on the determined purpose for the telephone call;

receiving customer input indicating the customer would like to conduct a video call;

in response to receiving the customer input, forwarding the telephone call to a video desktop computer, thereby resulting in the telephone call becoming the video call;

determining an interaction rating associated with the video call based at least in part on analysis of audio characteristics associated with the video call, wherein the audio characteristics comprise language, tone, and inflection associated with a call; and based on determining the interaction rating, updating a list of one or more preferred agents associated with the customer.

12. The method of claim 11, wherein determining the identity of the customer comprises:

determining a telephone number from which the telephone call was received;

comparing the telephone number with a plurality of entries in a customer information database; and determining that the telephone number matches an entry in the database.

13. The method of claim 11, wherein determining the identity of the customer comprises:

receiving a communication from the user device indicating that the customer has placed the telephone call.

14. The method of claim 13, wherein determining the identity of the customer further comprises:

determining that the customer is currently authenticated through an online banking session or a mobile application on the user device.

15. The method of claim 14, further comprising:

receiving a communication from the user device indicating the customer's identity.

16. The method of claim 11, further comprising:

retrieving information indicating the one or more preferred agents associated with the customer; and wherein selecting an agent is based on the one or more preferred agents.

17. The method of claim 11, further comprising:

determining a wait time for each of the selected one or more agents;

initiating communication of wait times to the customer;

receiving input from the customer indicating which of the one or more agents to route the telephone call; and wherein routing the telephone call to one of the selected agents comprises routing the telephone call to the agent indicated by the customer.

18. A computer program product for routing customer calls to preferred agents, the computer program product comprising:

a non-transitory computer-readable medium comprising a set of codes for causing a computer to:

receive a telephone call from a customer using a user device;

determine an identity of the customer;

retrieve information associated with a matching entry;

based at least in part on the retrieved information, select one or more agents;

determine a purpose of the telephone call, the determining comprising:

accessing an online banking history corresponding to the customer, determining recent customer financial activity based on the accessed online banking history, and determining the purpose of the call based on the recent customer financial activity;

route the call to one of the selected agents based at least in part on the determined purpose for the call;

receive customer input indicating the customer would like to conduct a video call;

in response to receiving the customer input, forward the telephone call to a video desktop computer, thereby resulting in the telephone call becoming the video call;

determine an interaction rating associated with the video call based at least in part on analysis of audio characteristics associated with the video call, wherein the audio characteristics comprise language, tone, and inflection associated with a call; and based on determining the interaction rating, update a list of one or more preferred agents associated with the customer.

\* \* \* \* \*